(12) United States Patent
Dunn et al.

(10) Patent No.: US 12,464,211 B2
(45) Date of Patent: Nov. 4, 2025

(54) IMAGING ASSEMBLY FOR AN OVEN APPLIANCE

(71) Applicant: Haier US Appliance Solutions, Inc., Wilmington, DE (US)

(72) Inventors: Wesley Dunn, Mount Juliet, TN (US); Jorge Mota, Columbia, TN (US); Ric Gilliland, Chattanooga, TN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/638,293

(22) Filed: Apr. 17, 2024

(65) Prior Publication Data

US 2025/0330692 A1    Oct. 23, 2025

(51) Int. Cl.

| | |
|---|---|
| *H04N 23/54* | (2023.01) |
| *F24C 15/04* | (2006.01) |
| *G02B 26/08* | (2006.01) |
| *G03B 11/00* | (2021.01) |
| *G02B 27/28* | (2006.01) |

(52) U.S. Cl.
CPC ......... *H04N 23/54* (2023.01); *G02B 26/0816* (2013.01); *G03B 11/00* (2013.01); *F24C 15/04* (2013.01); *G02B 27/288* (2013.01)

(58) Field of Classification Search
CPC ......... F24C 7/085; G03B 35/08; G06V 10/88; G06V 20/52; H04N 13/236; H04N 13/207
See application file for complete search history.

(56) References Cited

U.S. PATENT DOCUMENTS

| | | | |
|---|---|---|---|
| 9,615,007 B2 | 4/2017 | Pfaffinger, Jr. et al. | |
| 10,674,569 B2 | 6/2020 | Luckhardt et al. | |
| 10,808,941 B2 | 10/2020 | Matarazzi et al. | |
| 11,828,658 B2 | 11/2023 | Denker et al. | |
| 2014/0307059 A1* | 10/2014 | Haddad | H04N 13/271 348/47 |
| 2016/0137130 A1* | 5/2016 | Bing | B60R 1/06 156/247 |
| 2017/0074522 A1* | 3/2017 | Cheng | F24C 7/085 |
| 2017/0188416 A1* | 6/2017 | Beifuss | H05B 6/6447 |
| 2017/0261213 A1* | 9/2017 | Park | H04N 23/57 |
| 2019/0234617 A1* | 8/2019 | Bhogal | F24C 3/124 |
| 2022/0381439 A1 | 12/2022 | Bhogal et al. | |
| 2022/0400893 A1 | 12/2022 | Daly et al. | |
| 2023/0389750 A1* | 12/2023 | Bao | F24C 7/085 |

FOREIGN PATENT DOCUMENTS

| | | | | |
|---|---|---|---|---|
| CN | 206933972 U | 1/2018 | | |
| CN | 214259063 U | 9/2021 | | |
| WO | WO-2015185211 A2 * | 12/2015 | ............... | A21B 3/10 |

* cited by examiner

*Primary Examiner* — Mainul Hasan
(74) *Attorney, Agent, or Firm* — Dority & Manning, P.A.

(57) ABSTRACT

An oven appliance includes a cooking chamber positioned within a cabinet, a door rotatably mounted to the cabinet for providing selective access to the cooking chamber, the door comprising a window, a camera assembly configured for obtaining one or more images of the cooking chamber, wherein the camera assembly comprises a lens that is seated flat against the window and defines a field of view into the cooking chamber, and a mirror positioned within the cooking chamber for redirecting the field of view of the camera assembly toward a target cooking area of the cooking chamber.

20 Claims, 6 Drawing Sheets

IMAGING ASSEMBLY FOR AN OVEN APPLIANCE

FIELD OF THE INVENTION

The present subject matter relates generally to oven appliances, and more particularly, to door and camera assemblies for oven appliances.

BACKGROUND OF THE INVENTION

Conventional residential and commercial oven appliances generally include a cabinet that includes a cooking chamber for receipt of food items for cooking. Multiple heating elements are positioned within the cooking chamber to provide heat to food items located therein. The heating elements can include, for example, radiant heating elements, such as a bake heating assembly positioned at a bottom of the cooking chamber and/or a separate broiler heating assembly positioned at a top of the cooking chamber.

Conventional oven appliances include a door that provides selective access to the cooking chamber and typically includes a window to permit a user to view a cooking process. Notably, it may also be desirable to use a camera to generate images of food during a cooking process, e.g., to facilitate monitoring of the cooking progress via a display or a remote device, such as a mobile phone. However, wired or wireless in-oven cooking cameras are commonly very expensive and suffer from several drawback. For example, conventional cameras are not adjustable and only offer a downward looking view of the oven chamber. Moreover, there is commonly significant glare from internal door glass, e.g., where ambient light within the kitchen often shines through the window into the cooking chamber and such light can generate undesirable reflections that affect the image quality obtained by the camera.

Accordingly, an oven appliance that includes an improved camera assembly would be useful. More particularly, an oven appliance with a camera assembly that is capable of providing high-quality, reflection-free images would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an oven appliance is provided including a cooking chamber positioned within a cabinet, a door rotatably mounted to the cabinet for providing selective access to the cooking chamber, the door comprising a window, a camera assembly configured for obtaining one or more images of the cooking chamber, wherein the camera assembly comprises a lens that is seated flat against the window and defines a field of view into the cooking chamber, and a mirror positioned within the cooking chamber for redirecting the field of view of the camera assembly toward a target cooking area of the cooking chamber.

In another exemplary embodiment, an imaging assembly for an oven appliance is provided. The oven appliance including a cooking chamber positioned within a cabinet and a door rotatably mounted to the cabinet for providing selective access to the cooking chamber, the door comprising a window. The imaging assembly includes a camera assembly configured for obtaining one or more images of the cooking chamber, wherein the camera assembly comprises a lens that is seated flat against the window and defines a field of view into the cooking chamber and a mirror positioned within the cooking chamber for redirecting the field of view of the camera assembly toward a target cooking area of the cooking chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
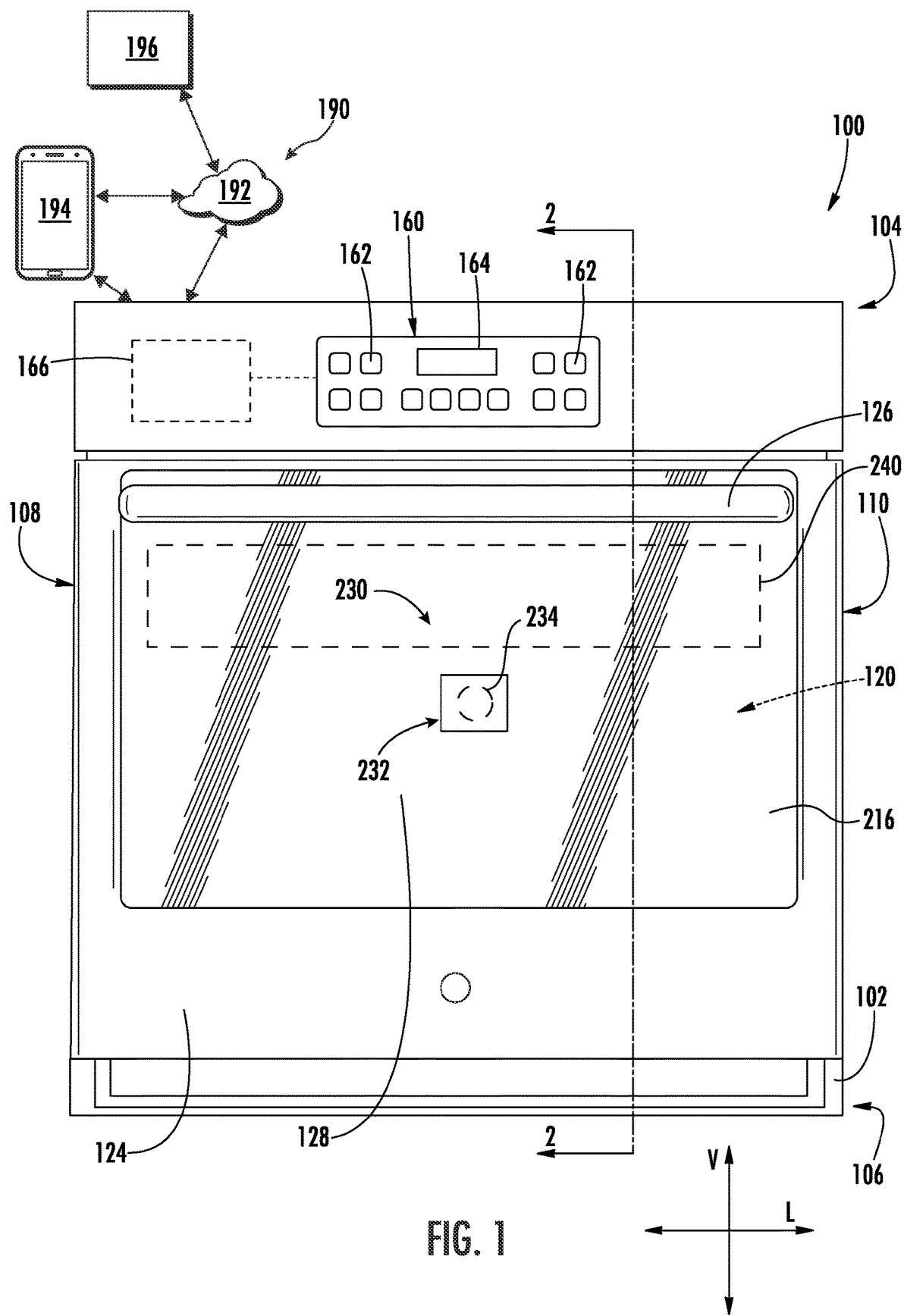
FIG. 1 is a front view of an oven appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
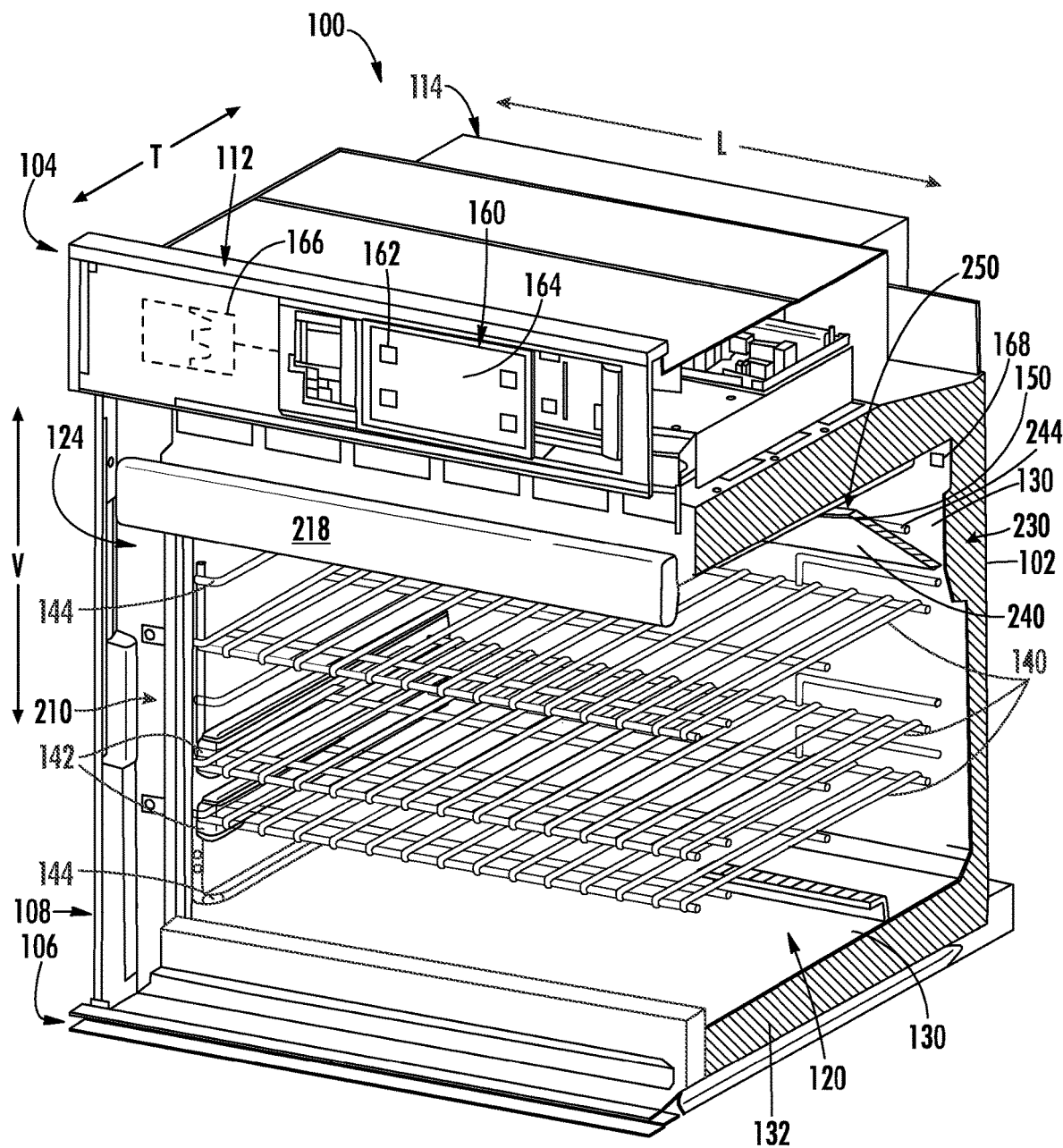
FIG. 2 is a perspective, cross-sectional view of the exemplary oven appliance of FIG. 1, taken along Line 2-2 in FIG. 1.
Figure 3:
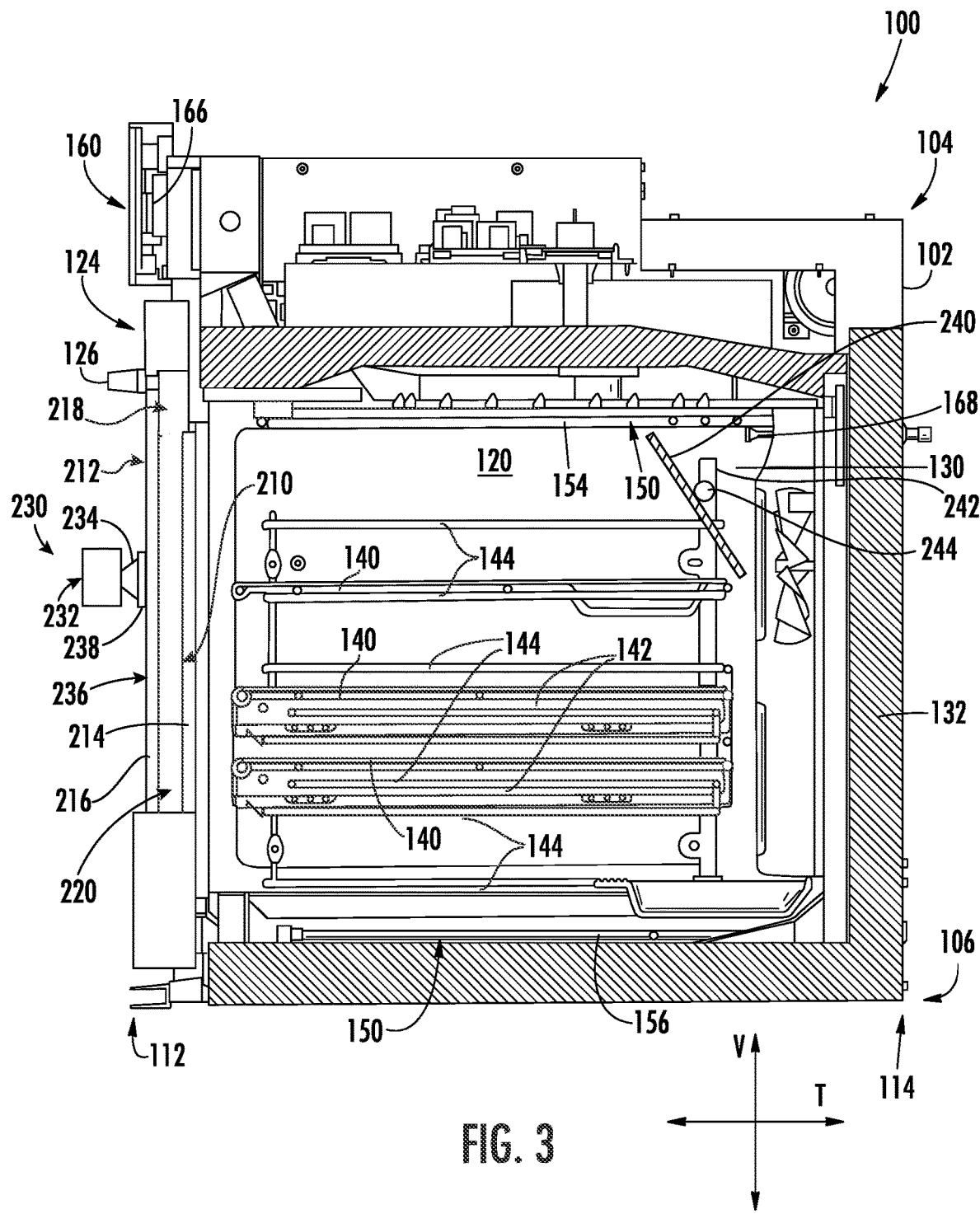
FIG. 3 is a side, cross-sectional view of the exemplary oven appliance of FIG. 1, taken along Line 2-2 in FIG. 1.

FIG. 1 provides a front view of an oven appliance 100 as may be employed with the present subject matter. In addition, FIGS. 2 and 3 provide perspective and side cross-sectional views, respectively, of oven appliance 100. As shown, oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that oven appliance 100 is provided by way of example only, and aspects of the present subject matter may be used in any suitable cooking appliance, such as a gas or electric double oven range appliance. For example, although oven appliance 100 is illustrated as a wall oven installed within a bank of cabinets, it should be appreciated that aspects of the present subject matter may be used in free-standing oven appliances, double ovens, etc. Moreover, aspects of the present subject matter may be used in any other consumer or commercial appliance where it is desirable to use a camera within another suitable appliance. Thus, the example embodiment shown in FIGS. 1 through 3 is not intended to limit the present subject matter to any particular cooking chamber configuration or arrangement.

Oven appliance 100 includes a door 124 rotatably attached to cabinet 102 in order to permit selective access to cooking chamber 120. Handle 126 is mounted to door 124 to assist a user with opening and closing door 124 in order to access cooking chamber 120. As an example, a user can pull on handle 126 mounted to door 124 to open or close door 124 and access cooking chamber 120. One or more transparent viewing windows 128 (FIG. 1) may be defined within door 124 to provide for viewing the contents of cooking chamber 120 when door 124 is closed and also assist with insulating cooking chamber 120. According to alternative embodiments, windows 128 may be omitted from door 124 altogether, while cavity visibility may be maintained using a camera system, e.g., as described herein.

In general, cooking chamber 120 is defined by a plurality of chamber walls 130 (FIGS. 2 and 3). Specifically, cooking chamber 120 may be defined by a top wall, a rear wall, a bottom wall, and two sidewalls 130. These chamber walls 130 may be joined together to define an opening through which a user may selectively access cooking chamber 120 by opening door 124. In order to insulate cooking chamber 120, oven appliance 100 includes an insulating gap defined between the chamber walls 130 and cabinet 102. According to an exemplary embodiment, the insulation gap is filled with an insulating material 132, such as insulating foam or fiberglass, for insulating cooking chamber 120.

Referring now to FIG. 3, oven appliance 100 may include a plurality of racks 140 positioned within cooking chamber 120 for receiving food or cooking utensils containing food items. Racks 140 provide support for such food during a cooking process. According to the illustrated embodiment, racks 140 may be slidably mounted within cooking chamber 120 by one or more slide assemblies 142 that are mounted to a sidewall 130 of cooking chamber 120. Alternatively, racks 140 may be slidably received onto embossed ribs or sliding rails such that racks 140 may be conveniently moved into and out of cooking chamber 120.

As best shown in FIG. 3, oven appliance may include six rack supports 144 that are spaced apart along the vertical direction V. In addition, oven appliance 100 is illustrated as including three racks 140 that may each be slidably positioned on each of the six rack supports, such that six total rack positions are possible within cooking chamber 120. However, it should be appreciated that according to alternative embodiments, any suitable number of racks mounted in cooking chamber 120 in any suitable manner and being movable between any suitable number of positions is possible and within the scope of the present subject matter.

Oven appliance may further include one or more heating elements (identified generally by reference numeral 150) positioned within cabinet 102 or may otherwise be in thermal communication with cooking chamber 120 for regulating the temperature within cooking chamber 120. For example, heating elements 150 may be electric resistance heating elements, gas burners, microwave heating elements, halogen heating elements, or suitable combinations thereof. According to an exemplary embodiment, oven appliance 100 is a self-cleaning oven. In this regard, heating elements 150 may be configured for heating cooking chamber 120 to a very high temperature (e.g., 800° F. or higher) in order to burn off any food residue or otherwise clean cooking chamber 120.

Specifically, an upper gas or electric heating element 154 (also referred to as a broil heating element or gas burner) may be positioned in cabinet 102, e.g., at a top portion of cooking chamber 120, and a lower gas or electric heating element 156 (also referred to as a bake heating element or gas burner) may be positioned at a bottom portion of cooking chamber 120. Upper heating element 154 and lower heating element 156 may be used independently or simultaneously to heat cooking chamber 120, perform a baking or broil operation, perform a cleaning cycle, etc. The size and heat output of heating elements 154, 156 can be selected based on the, e.g., the size of oven appliance 100 or the desired heat output. Oven appliance 100 may include any other suitable number, type, and configuration of heating elements 150 within cabinet 102. For example, oven appliance 100 may further include electric heating elements, induction heating elements, or any other suitable heat generating device.

A user interface panel 160 is located within convenient reach of a user of the oven appliance 100. For this example embodiment, user interface panel 160 includes user inputs 162 that may generally be configured for regulating heating elements 150 or operation of oven appliance 100. In this manner, user inputs 162 allow the user to activate each heating element 150 and determine the amount of heat input provided by each heating element 150 to a cooking food items within cooking chamber 120. Although shown with user inputs 162, it should be understood that user inputs 162 and the configuration of oven appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, oven appliance 100 may include a controller 166 in operative communication with user interface panel 160. User interface panel 160 of oven appliance 100 may be in communication with controller 166 via, for example, one or more signal lines or shared communication busses, and signals generated in controller 166 operate oven appliance 100 in response to user input via user inputs 162. Input/Output ("I/O") signals may be routed between controller 166 and various operational components of oven appliance 100 such that operation of oven appliance 100 can be regulated by controller 166. In addition, controller 166 may also be a communication with one or more sensors, such as temperature sensor 168 (FIG. 2), which may be used to measure temperature inside cooking chamber 120 and provide such measurements to the controller 166. Although temperature sensor 168 is illustrated at a top and rear of cooking chamber 120, it should be appreciated that other sensor types, positions, and configurations may be used according to alternative embodiments.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Referring still to FIG. 1, a schematic diagram of an external communication system 190 will be described according to an exemplary embodiment of the present subject matter. In general, external communication system 190 is configured for permitting interaction, data transfer, and other communications between and among oven appliance 100 and/or a user of oven appliance 100. For example, this communication may be used to provide and receive operating parameters, cycle settings, performance characteristics, user preferences, or any other suitable information for improved performance of oven appliance 100. In addition, according to aspects of the present subject matter, external communication system 190 may be used to transfer images or video to a user of oven appliance 100, as described in more detail below.

External communication system 190 permits controller 166 of oven appliance 100 to communicate with external devices either directly or through a network 192. For example, a consumer may use a consumer device 194 to communicate directly with oven appliance 100. Alternatively, these appliances may include user interfaces for receiving such input (described below). For example, consumer devices 194 may be in direct or indirect communication with oven appliance 100, e.g., directly through a local area network (LAN), Wi-Fi, Bluetooth, Zigbee, etc. or indirectly through network 192. In general, consumer device 194 may be any suitable device for providing and/or receiving communications, displaying images or video, or receiving commands from a user. In this regard, consumer device 194 may include, for example, a personal phone, a tablet, a laptop computer, or another mobile device.

In addition, a remote server 196 may be in communication with oven appliance 100 and/or consumer device 194 through network 192. In this regard, for example, remote server 196 may be a cloud-based server 196, and is thus located at a distant location, such as in a separate state, country, etc. In general, communication between the remote server 196 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In general, network 192 can be any type of communication network. For example, network 192 can include one or more of a wireless network, a wired network, a personal area network, a local area network, a wide area network, the internet, a cellular network, etc. According to an exemplary embodiment, consumer device 194 may communicate with a remote server 196 over network 192, such as the internet, to provide user inputs, transfer operating parameters or performance characteristics, cycle authorizations, display images or video, etc. In addition, consumer device 194 and remote server 196 may communicate with oven appliance 100 to communicate similar information.

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more oven or cooking appliances, other communication protocols and steps may be implemented, etc. These variations and modifications are contemplated as within the scope of the present subject matter.

Figure 4:
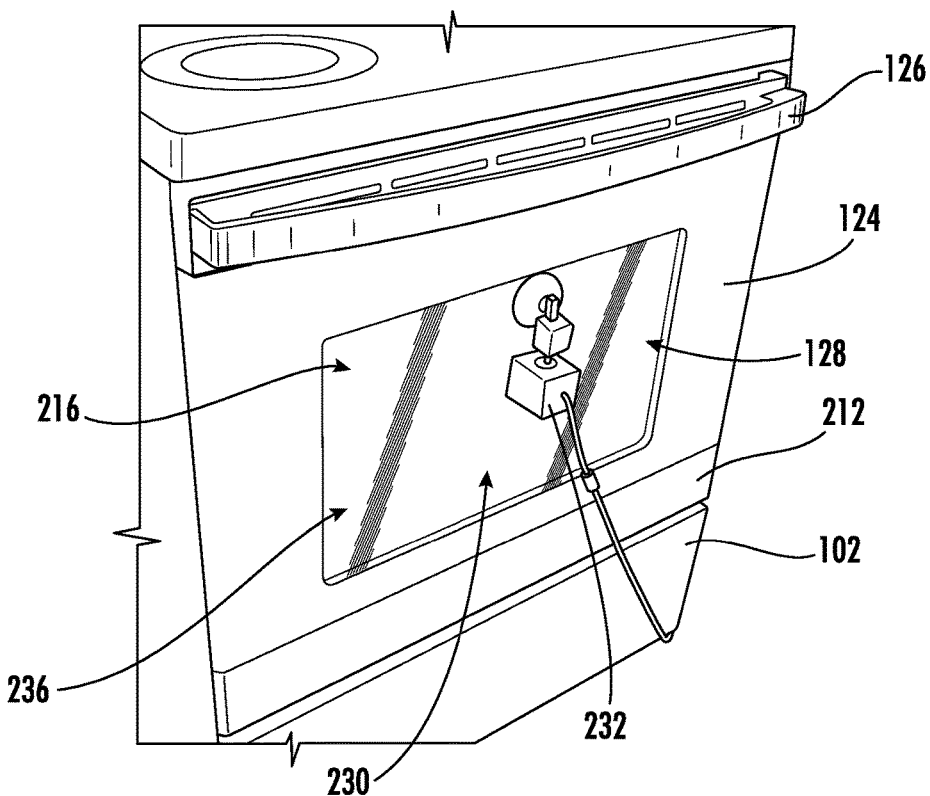
FIG. 4 provides a perspective of a door and camera assembly that may be used with the exemplary oven appliance of FIG. 1 according to an exemplary embodiment of the present subject matter.
Figure 5:
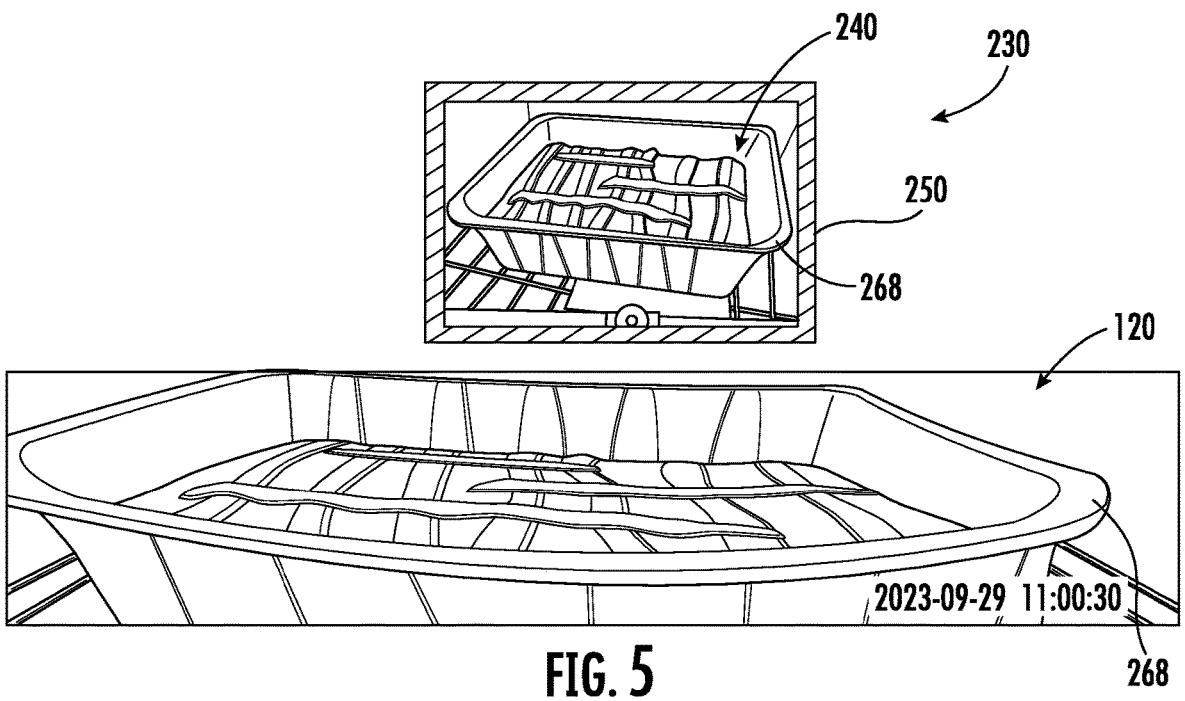
FIG. 5 provides an example image obtained using the example camera assembly of FIG. 4 according to an exemplary embodiment of the present subject matter.

As best shown in FIGS. 2 through 4, door 124 generally includes an inner door panel 210 positioned proximate cooking chamber 120 and an outer door panel 212 positioned proximate an ambient environment (e.g., outside of oven appliance 100). In general, each of inner door panel 210 and outer door panel 212 may include one or more transparent windows (such as window 128). Although these windows are referred to herein as glass panes, it should be appreciated that these transparent windows may be constructed of any suitably rigid and temperature resistant material, e.g., such as acrylic glass or Plexiglass. Although door 124 is described in here as having two or more transparent panels 210, 212, it should be appreciated that according to alternative embodiments, door 124 may include fewer than or more than two panels formed from any suitable transparent material.

Specifically, according to the illustrated embodiment, inner door panel 210 includes an inner glass pane 214 (which is closest to or faces cooking chamber 120) and outer door panel 212 includes an outer glass pane 216. A spacer bracket 218 is positioned between inner glass pane 214 and outer glass pane 216 to maintain a gap between the two glass panes. Specifically, inner glass pane 214 and outer glass pane 216 are separated by an air gap 220 along the transverse direction T (e.g., when door 124 is closed). In general, air gap 220 defines helps insulate cooking chamber 120. Although inner door panel 210 and outer door panel 212 are illustrated herein as having single glass panes, it should be appreciated that each assembly may include multiple glass panes or any other suitable construction according to alternative embodiments. For example, door panels 210, 212 may include any suitable number of transparent windows formed from any suitable material may be used according to alternative embodiments.

According to an example embodiment of the present subject matter, oven appliance 100 includes an imaging assembly 230 that is configured to obtain images within cooking chamber 120. In this regard, one or more images, photos, videos, live streams, or other visual feedback of food items cooking within cooking chamber 120 may be obtained using imaging assembly 230 and returned to controller 166. According to example embodiments, controller 166 may then analyze the images to assess cooking status and/or may communicate the images to a user of the oven appliance 100. In this regard, for example, the one or more images may be displayed on user interface panel 160, communicated to a remote device 194 (e.g., such as user's mobile phone) over an external network 192, etc. Although an example construction of imaging assembly 230 is described below, it should be appreciated that variations and modifications may be made while remaining within the scope of the present subject matter.

According to the illustrated embodiment, imaging assembly 230 includes a camera assembly 232 configured for obtaining the one or more images of cooking chamber 120. For example, camera assembly 232 may include a lens 234 that defines a field of view into cooking chamber 120. According to example embodiments, lens 234 is seated flush or flat against window 128, thereby minimizing glare and undesirable reflections. Camera assembly 232 may be in wired or wireless communication with controller 166 for receiving imaging instructions and transmitting obtained images.

Camera assembly 232 may be positioned at any suitable location on window 128 of oven appliance. For example, camera assembly 232 may be directly mounted to an outer surface 236 of window 128 (e.g., to an outer glass pane 216 of window 128). According to the illustrated embodiment, camera assembly 232 is mounted to a middle of window 128 along the lateral direction L and a middle of window 128 along the vertical direction V, though other suitable positioning is possible and within the scope of the present subject matter. For example, according to alternative embodiments, camera assembly 232 may be positioned proximate a top of window 128.

According to example embodiments, camera assembly 232 may include additional features for improved imaging of cooking chamber 120. For example, camera assembly 232 may include a polarizing filter 238 positioned over lens 234. According to still other embodiments, camera assembly 232 may include additional filters, glare reducing features, etc. In addition, it should be appreciated that camera assembly 232 may be fixed to window 128 or may be removable (e.g., attached via suction cups, adhesive, or any other means of attachment). In addition, camera assembly 232 may include a light source for selectively illuminating cooking chamber 120 or a cabinet light (not shown) of oven appliance 100 may be used for improved imaging.

Notably, when camera assembly 232 is positioned in this manner, the field of view of camera assembly 232 is focused or directed in a direction parallel to the transverse direction T (e.g., perpendicular to glass panes of window 128). Accordingly, camera assembly 232 may have difficulty obtaining complete images or representations of the food items being cooked in the cooking chamber 120. Accordingly, aspects of the present subject matter are directed to an imaging assembly 230 that reduces glare while maintaining a desired focus or view of food items being cooked. Specifically, according to an example embodiment, imaging assembly 230 includes a mirror 240 positioned within cooking chamber 120 for redirecting the field of view of camera assembly 232 toward a target cooking area of cooking chamber 120.

In general, mirror 240 may be any suitable reflective surface for redirecting the field of view of camera assembly 232 for improved visibility of food items being cooked within cooking chamber 120. For example, mirror 240 may be constructed of at least one of polished stainless steel, ceramic glass, or any other suitable reflective material. In addition, it should be appreciated that mirror 240 may be positioned at any suitable location within cooking chamber 120. For example, according to the illustrated embodiment, mirror 240 is positioned at a back of cooking chamber 120 and is angled toward a center of cooking chamber 120. According to the illustrated embodiment, mirror 240 is a flat mirror, though mirror 240 may alternatively be curved, or may be formed from multiple segments having different shapes for creating an improved reflective image. Other geometrical variations are possible and within the scope of the present subject matter.

According to example embodiments, mirror 240 may be adjustable, e.g., through manual manipulation or through one or more mechanical actuators, slide rails, geared arrangements, or other mechanical adjustment mechanisms 242. For example, mirror 240 may be adjustable along the vertical direction V to direct the field of view to a different target cooking region based on the height or position of food items being cooked. According to still other embodiments, mirror 240 may be pivotable about a pivot axis 244. In this manner, the field of view of camera assembly 232 may be directed to any desirable zone or zones within cooking chamber 120 for improved imaging of food items being cooked.

According to example embodiments, imaging assembly 230 may further include a border 250 or frame surrounding mirror 240. In this manner, controller 166 may be used to analyze the obtained images, e.g., by differentiating or identifying a reflective surface of mirror 240 relative to border 250. In this manner, the obtained images may be cropped or focused to remove border 250 and emphasize the food items being cooked. Border 250 may be formed from any suitable material and may have one or more identifiable patterns for easy recognition and identification by controller 166.

Although an imaging assembly 230 including a single camera and mirror 240 is described and illustrated herein, it should be appreciated that imaging assembly 230 may include multiple cameras and/or mirrors 240, e.g., to obtain images of different food items or regions of cooking chamber 120. In this regard, mirror 240 may be a first mirror 240 focused on a first target region of cooking chamber 120 and imaging assembly 230 may further include a second mirror (not shown) focused on a second target region of cooking chamber 120. In this manner, a single camera assembly 232 may be used to monitor multiple regions within cooking chamber 120. Other variations are possible and within the scope of the present subject matter.

Figure 6:
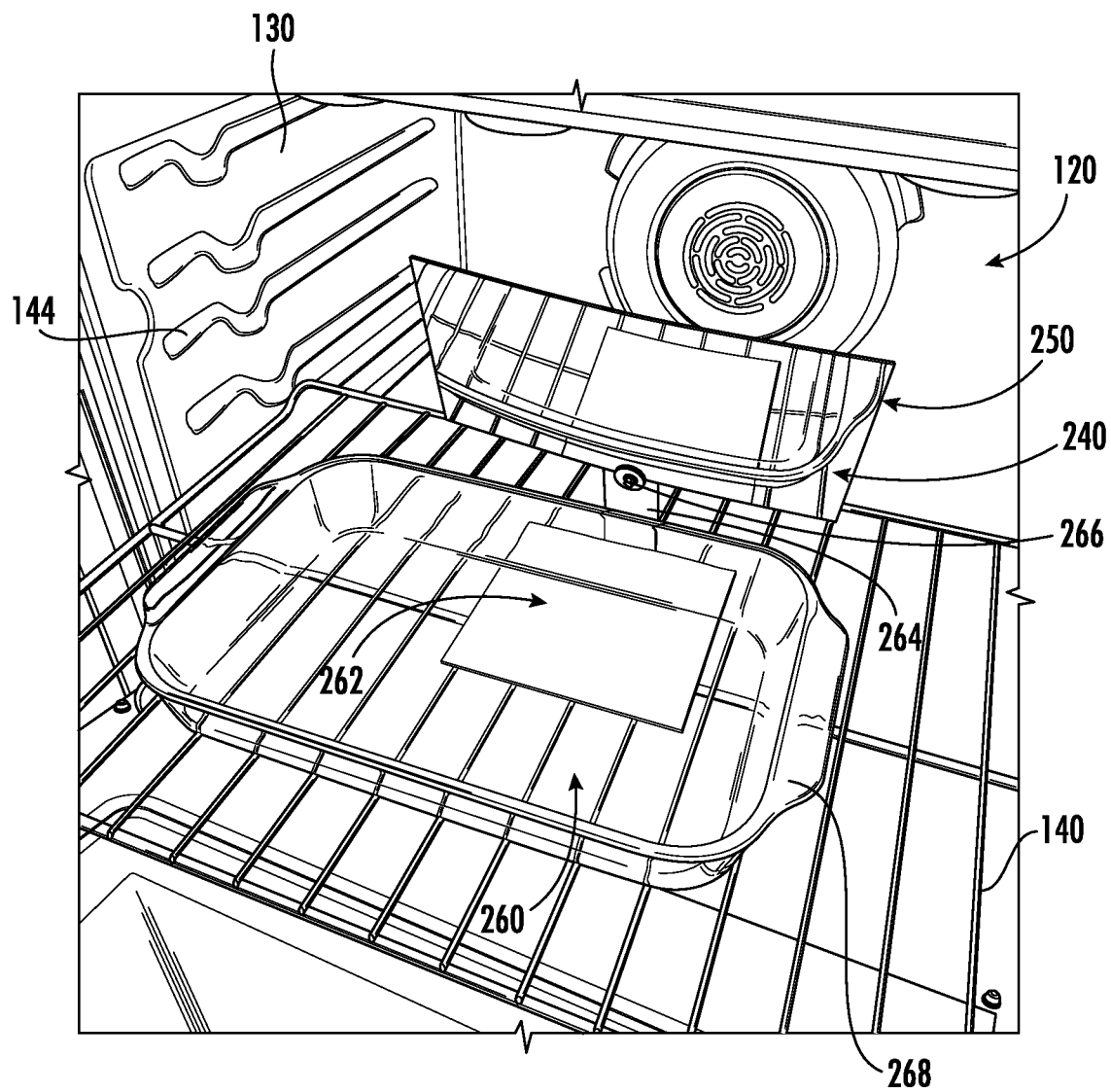
FIG. 6 provides a perspective view of a movable mirror assembly that may be used with the exemplary oven appliance of FIG. 1 according to an exemplary embodiment of the present subject matter.
Figure 7:
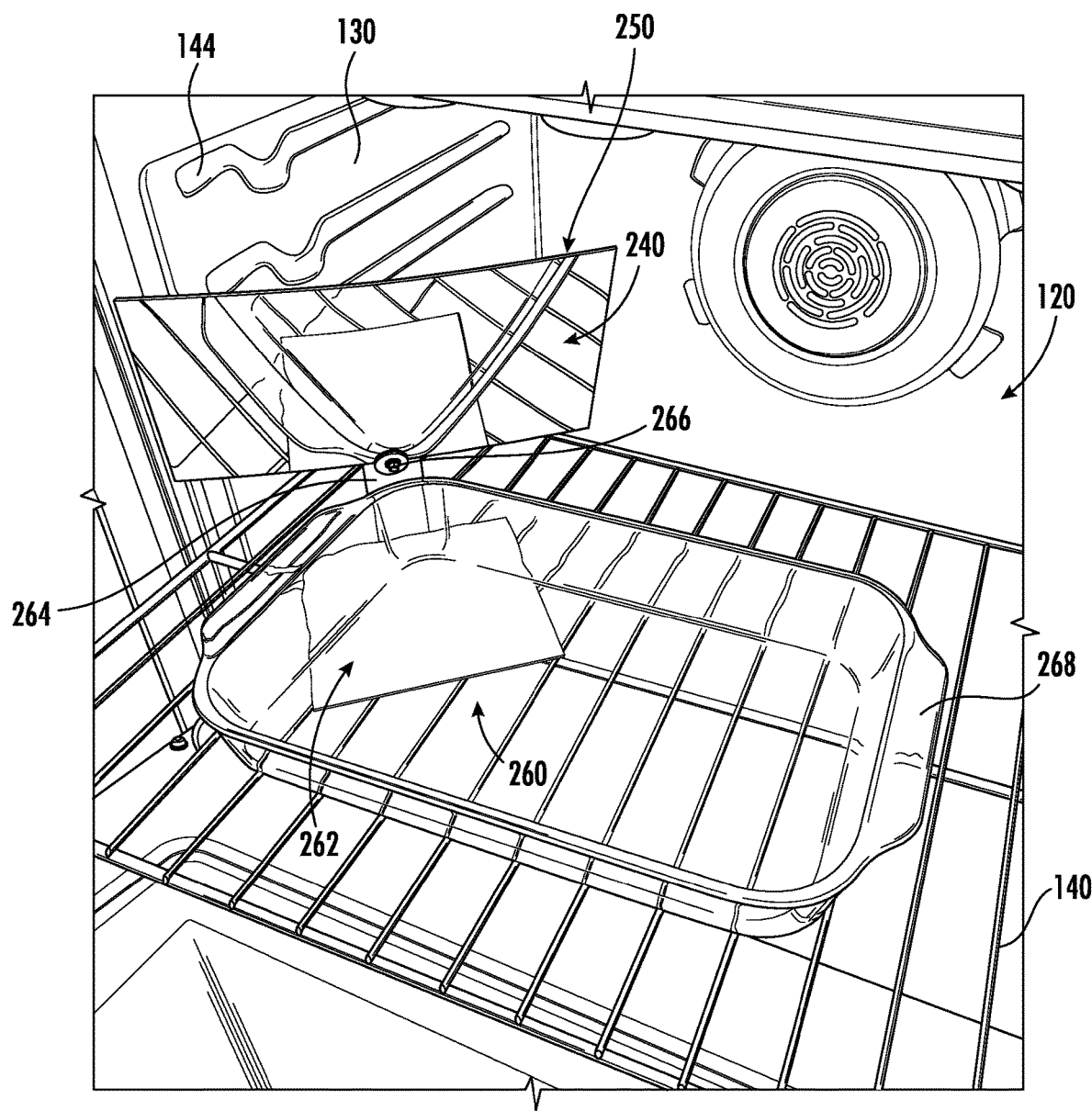
FIG. 7 provides a perspective view of a movable mirror assembly that may be used with the exemplary oven appliance of FIG. 1 according to an exemplary embodiment of the present subject matter.

As illustrated and described above, mirror 242 is mounted within cooking chamber 120 using various mechanical mounts and/or mechanical adjustment mechanisms 242. However, it should be appreciated that according to alternative embodiments, mirror 240 may be manually positioned and oriented within cooking chamber 120 in any other suitable manner. For example, as shown in FIGS. 6 and 7, mirror 240 may be mounted on a free floating stand 260 that a user may manipulate as desired to get the ideal field of view from camera assembly 232.

For example, according to the illustrated embodiment free floating stand 260 includes a flat base 262 and a vertical support arm 264 extending therefrom. Mirror 240 may be movably mounted to a top of vertical support arm 264 using an adjustment pin 266 that permits rotation and/or pivoting of mirror 240 relative to free floating stand 260. In this manner, a user may position flat base 262 under a cooking utensil 268 for secure mounting within cooking chamber 120. In addition, a user may pivot or rotate mirror 240 as desired to get the desired field of view of cooking utensil 268.

As explained herein, aspects of the present subject matter are generally directed to an aftermarket module for monitoring the cooking process using a camera and a mirror. The mirror may be installed within an oven cavity and the camera may be mounted at the desired location on the outer side of the door to capture the image from the mirror positioned inside the oven. The image reflected by the mirror may be captured by the camera and further sent to the user via wireless communication. As a result, the wireless device or mobile phone software application that can be used to monitor the cooking progress of a dish inside an oven cavity. Furthermore, the image may be modified to the needs of everyone who wants to watch their meal cook using the software application and other wireless devices of their choice.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
   a cooking chamber positioned within a cabinet;
   a door rotatably mounted to the cabinet for providing selective access to the cooking chamber, the door comprising a window;
   a camera assembly configured for obtaining one or more images of the cooking chamber, wherein the camera assembly comprises a lens that is seated flat against the window and defines a field of view into the cooking chamber; and
   a mirror assembly positioned within the cooking chamber for redirecting the field of view of the camera assembly toward a target cooking area of the cooking chamber, wherein the mirror assembly comprises:
      a flat base positionable under a cooking utensil;
      a vertical support arm extending upward from the flat base; and
      a mirror mounted to a top of the vertical support arm.

2. The oven appliance of claim 1, wherein the camera assembly is positioned proximate a top of the window.

3. The oven appliance of claim 1, wherein the camera assembly further comprises a polarizing filter positioned over the lens.

4. The oven appliance of claim 1, wherein the mirror is positioned at a back of the cooking chamber and is angled toward a center of the cooking chamber.

5. The oven appliance of claim 1, wherein the mirror is adjustable along the vertical direction.

6. The oven appliance of claim 1, wherein the mirror is pivotable about a pivot axis.

7. The oven appliance of claim 1, wherein the mirror is flat.

8. The oven appliance of claim 1, wherein the mirror is curved.

9. The oven appliance of claim 1, wherein the mirror is constructed of at least one of polished stainless steel or ceramic glass.

10. The oven appliance of claim 1, further comprising:
    a border or frame surrounding the mirror and being differentiated relative to a mirror surface.

11. The oven appliance of claim 1, wherein the mirror is a first mirror, the oven appliance further comprising:
    a second mirror positioned within the cooking chamber for reorienting the field of view of the camera assembly toward a secondary target cooking area of the cooking chamber.

12. The oven appliance of claim 1, wherein the field of view of the camera assembly is perpendicular to glass panes of the window.

13. The oven appliance of claim 1, wherein the camera assembly is mounted on an outer surface of the window.

14. The oven appliance of claim 1, wherein the camera assembly is removable from the window.

15. An imaging assembly for an oven appliance, the oven appliance comprising a cooking chamber positioned within a cabinet and a door rotatably mounted to the cabinet for providing selective access to the cooking chamber, the door comprising a window, the imaging assembly comprising:
    a camera assembly configured for obtaining one or more images of the cooking chamber, wherein the camera assembly comprises a lens that is seated flat against the window and defines a field of view into the cooking chamber; and
    a mirror assembly positioned within the cooking chamber for redirecting the field of view of the camera assembly toward a target cooking area of the cooking chamber, wherein the mirror assembly comprises:
a flat base positionable under a cooking utensil;
a vertical support arm extending upward from the flat base; and
a mirror mounted to a top of the vertical support arm.

16. The imaging assembly of claim 15, wherein the mirror is positioned at a back of the cooking chamber and is angled toward a center of the cooking chamber.

17. The imaging assembly of claim 15, wherein the mirror is adjustable along a vertical direction or pivotable about a pivot axis.

18. The imaging assembly of claim 15, wherein the mirror is flat or curved.

19. The imaging assembly of claim 15, further comprising:
a border or frame surrounding the mirror and being differentiated relative to a mirror surface.

20. The imaging assembly of claim 15, wherein the mirror is a first mirror, the imaging assembly further comprising:
a second mirror positioned within the cooking chamber for reorienting the field of view of the camera assembly toward a secondary target cooking area of the cooking chamber.

* * * * *